United States Patent
Chuang (10) Patent No.: US 7,976,041 B2
(45) Date of Patent: Jul. 12, 2011

(54) BICYCLE MUDGUARD WITH CLAMPING ASSEMBLY

(76) Inventor: Louis Chuang, Taichung (TW)

( * ) Notice: Subject to any disclaimer, the term of this patent is extended or adjusted under 35 U.S.C. 154(b) by 297 days.

(21) Appl. No.: 12/344,685

(22) Filed: Dec. 29, 2008

(65) Prior Publication Data

US 2010/0164195 A1    Jul. 1, 2010

(51) Int. Cl.
*B62D 25/18* (2006.01)

(52) U.S. Cl. ................... 280/152.1; 280/848

(58) Field of Classification Search ........... 280/847, 280/848, 851, 160, 160.1, 152.1, 152.3, 288.4, 280/152.2, 158.1, 852
See application file for complete search history.

(56) References Cited

U.S. PATENT DOCUMENTS

| | | | |
|---|---|---|---|
| 5,275,427 A * | 1/1994 | Gasser | 280/152.3 |
| 6,331,011 B1 * | 12/2001 | Feldmann et al. | 280/152.1 |
| 6,435,533 B1 * | 8/2002 | Chuang | 280/152.1 |
| 6,446,994 B1 * | 9/2002 | Smerdon, Jr. | 280/152.1 |
| 2003/0047934 A1 * | 3/2003 | Tsukiji | 280/847 |

FOREIGN PATENT DOCUMENTS

TW    564846    12/2003

* cited by examiner

*Primary Examiner* — Jeffrey J Restifo
*Assistant Examiner* — Bridget Avery
(74) *Attorney, Agent, or Firm* — Alan Kamrath; Kamrath & Associates PA (57) ABSTRACT

A front bicycle mudguard is detachably coupled with a clamping assembly. The mudguard has a main body, and a head portion is defined on an end of the main body, with a fixed end provided on an extremity of the head portion. The clamping assembly includes one first clamping device and two second clamping devices. The first clamping device includes a tightening member and a clamping member. The tightening member is inserted into an orifice of a front fork of the bicycle, with an end of the clamping member engaged with the tightening member. Another end of the clamping member is detachably installed to the fixed end. Each second clamping device includes a belt adapted to quickly attach to/detach from the front fork.

16 Claims, 7 Drawing Sheets

BICYCLE MUDGUARD WITH CLAMPING ASSEMBLY

BACKGROUND OF THE INVENTION

1. Field of the Invention

The present invention relates to a bicycle mudguard with a clamping assembly and, more particularly, a bicycle mudguard with a clamping assembly adapted to couple the bicycle mudguard to a front fork of a bicycle easily and quickly.

2. Description of the Related Art

A typical bicycle generally includes mudguards to prevent the cyclist from being splashed with mud during cycling. In addition, attachment of the mudguards to the bicycle is troublesome, as one has to detach the brakes before attachment of the mudguards and reattach the brakes after attachment of the mudguards.

Referring to Taiwan Patent No. 564846, it discloses a bicycle mudguard. Two sides of the mudguard are respectively engaged with two support rods via eight bolts so that the support rods are adapted to install the mudguard to ratchet disks of the bicycle. While the mudguard is desired to be disassembled from the bicycle, it is needed to disengage the eight bolts. It wastes time and energy.

The present invention will become clearer in light of the following detailed description of illustrative embodiments of this invention described in connection with the drawings.

SUMMARY OF THE INVENTION

Aspects of the present invention address one or more of the issues mentioned above, thereby providing a front mudguard of a bicycle. The front mudguard is detachably installed to the bicycle via a clamping assembly. The mudguard includes a head portion and a main body, and the clamping assembly includes one first and two second clamping devices. The first clamping device includes a clamping member and a tightening member. A fixed end is provided on the extremity of the head portion. An end of the clamping member is coupled to the tightening member, and another end of the clamping member is detachably installed to the fixed end. Two second clamping devices are respectively fixed to two sides of the main body of the mudguard. Each second clamping device includes a belt adapted to tie on a front fork of the bicycle detachably. The mudguard is securely attached to the bicycle in 3-point contact and can be detached from the bicycle quickly and conveniently by the clamping assembly.

These and other aspects are addressed in relation to the drawings and related description.

BRIEF DESCRIPTION OF THE DRAWINGS

The present invention will be described via detailed illustration of the preferred embodiments referring to the drawings.

DETAILED DESCRIPTION OF THE PREFERRED EMBODIMENT

Figure 1:
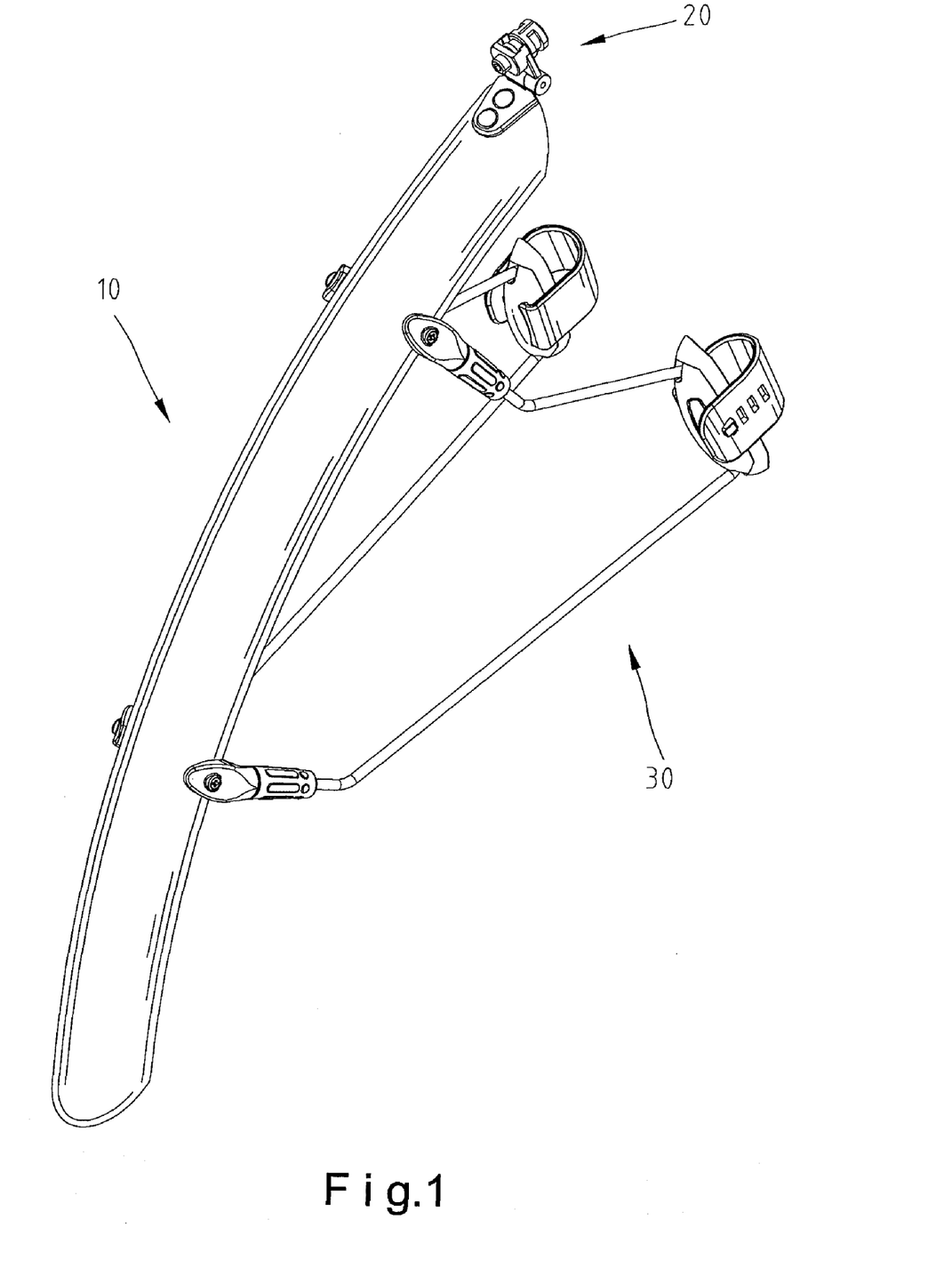
FIG. 1 shows a perspective view of a bicycle mudguard with a clamping assembly in accordance with the first embodiment of the present invention.
Figure 2:
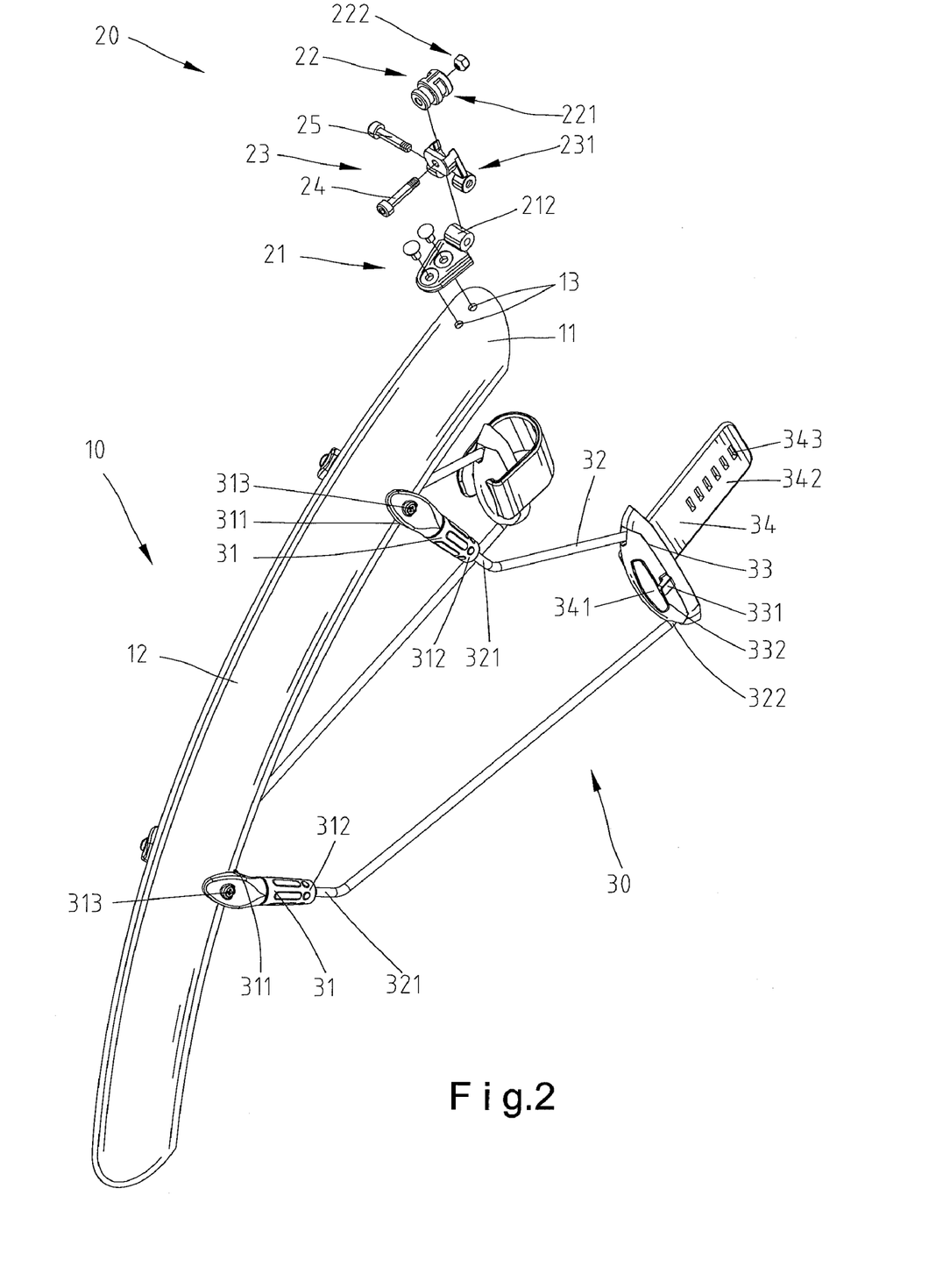
FIG. 2 shows a partial, exploded perspective view of the clamping assembly shown in FIG. 1.
Figure 3:
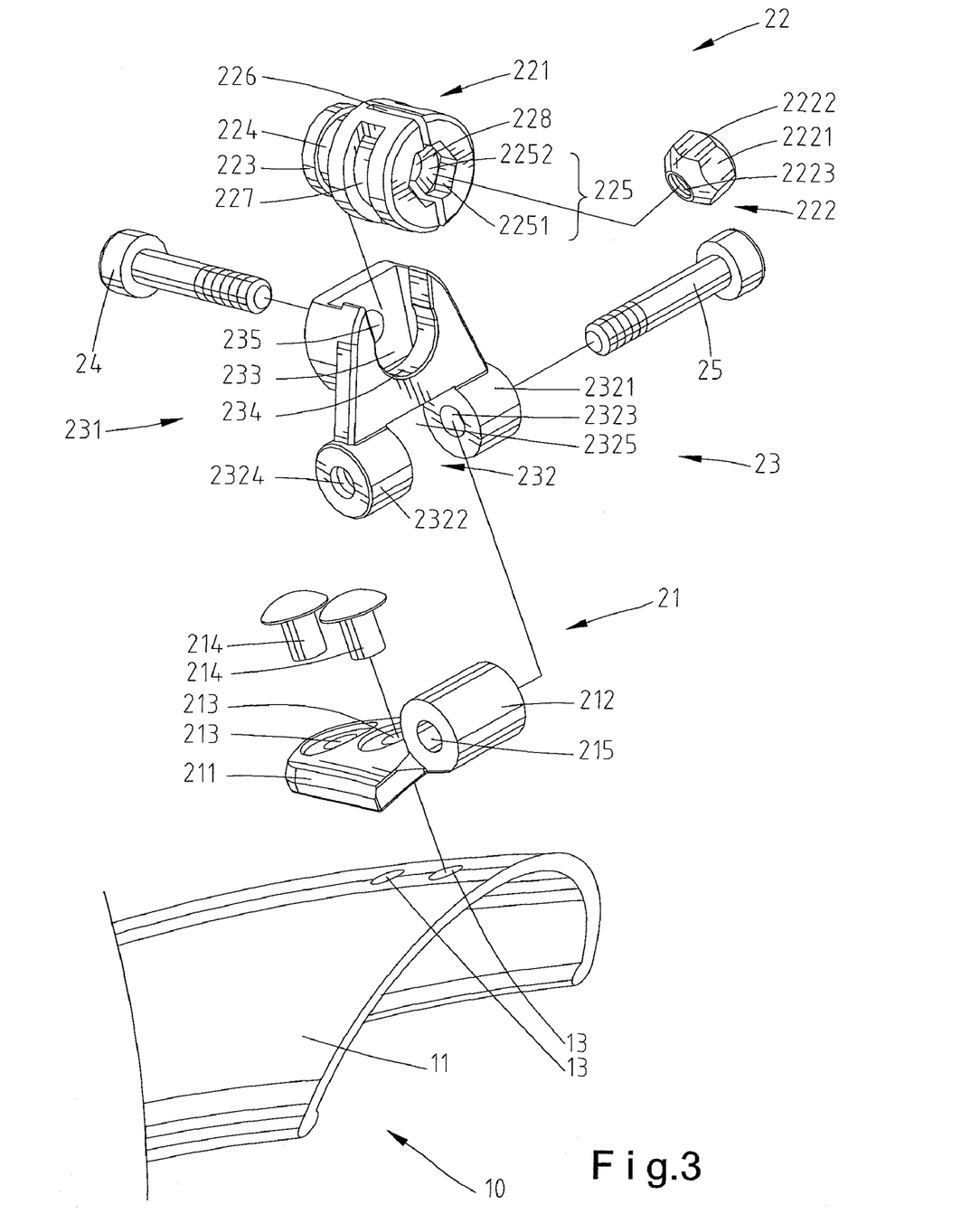
FIG. 3 is an enlarged view of a first clamping device of the clamping assembly shown in FIG. 1.

For a better understanding of a first embodiment of the present invention, reference is made to FIGS. 1 to 3. A front mudguard 10 for the bicycle is an arc-shaped single piece construction and includes a main body 12, a head portion 11 which extends from an end of the main body 12, and two apertures 13 formed on the head portion 11.

Figure 5:
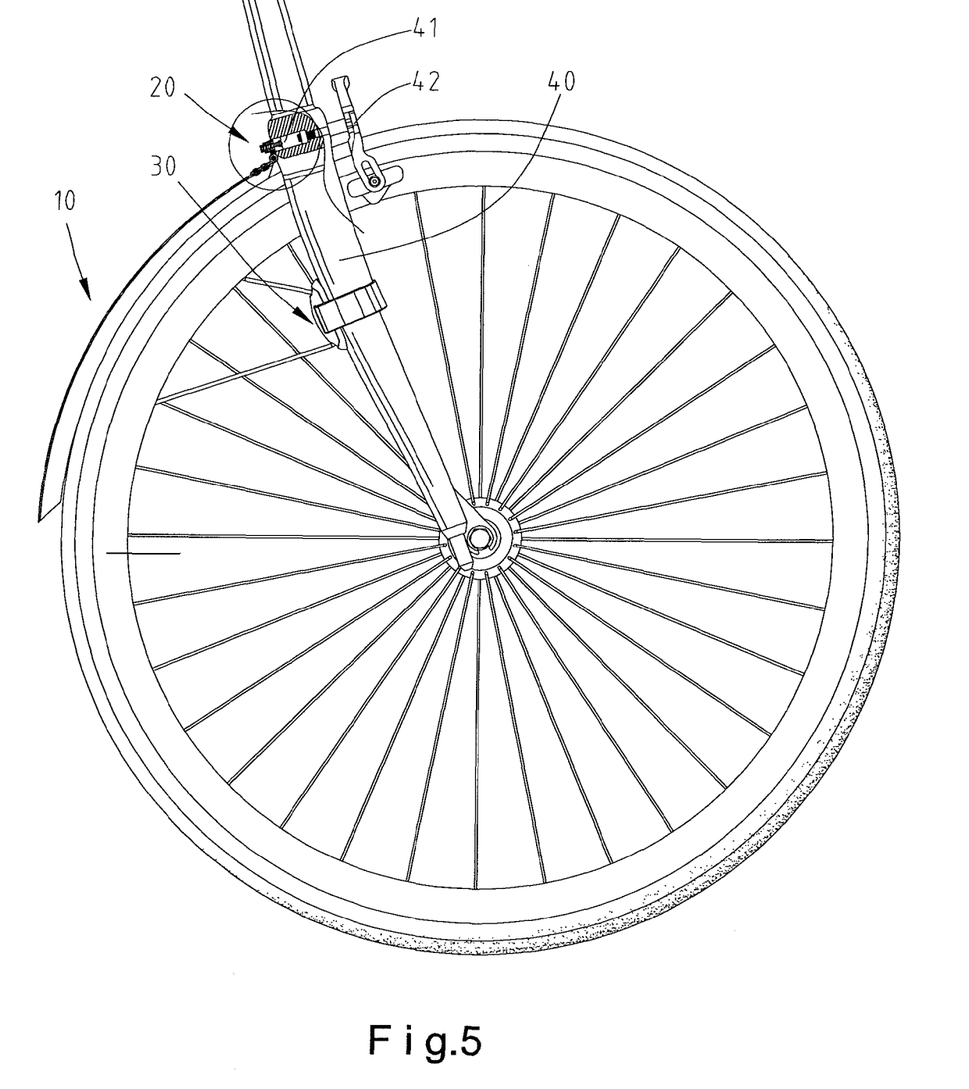
FIG. 5 shows a side view of a bicycle mudguard assembled to a front fork and a front brake of a bicycle in accordance with the present invention.
Figure 6:
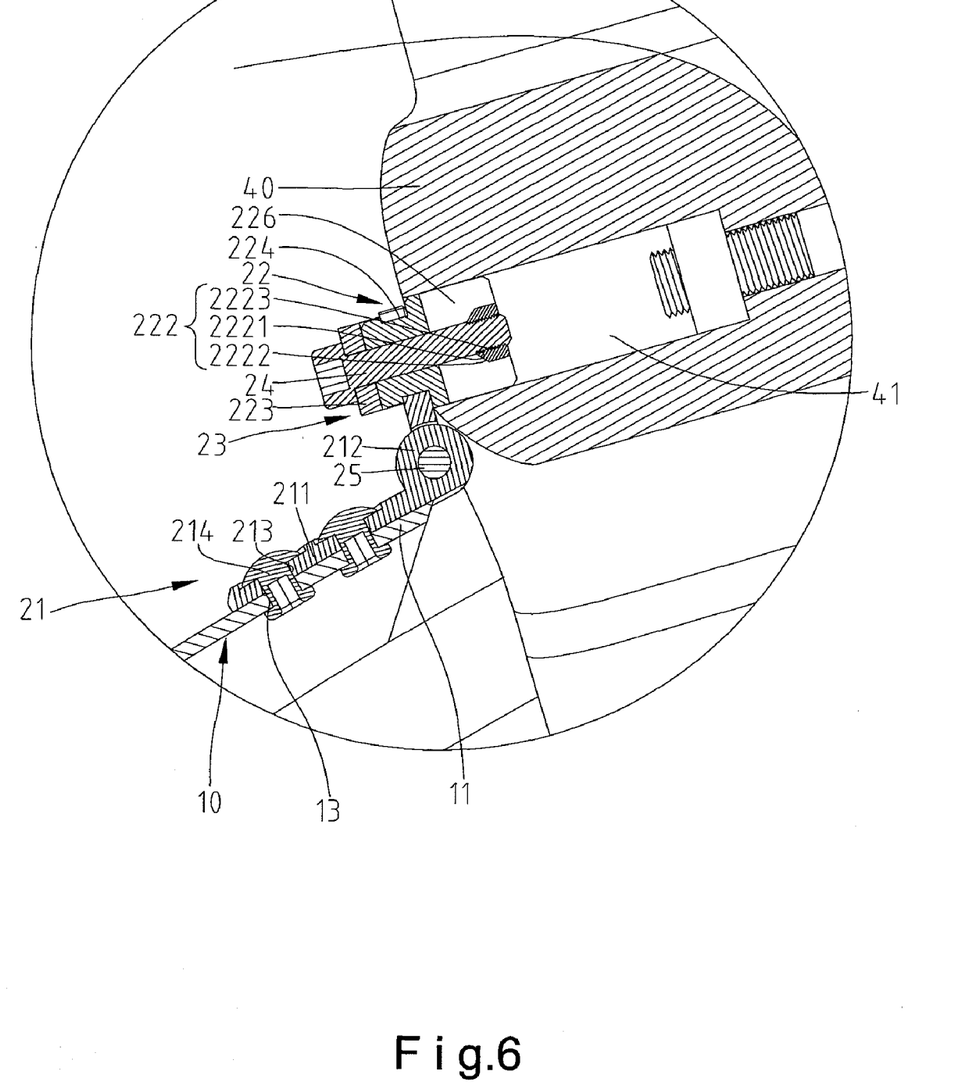
FIG. 6 is an enlarged, partial cross-section view of FIG. 5, showing the bicycle mudguard in accordance with the first embodiment of the present invention.

The front mudguard 10 is attached to a front fork 40 and a front brake 42 of a bicycle via a clamping assembly (shown in FIGS. 5 and 6). The clamping assembly includes one first clamping device 20 installed on the head portion 11 and two second clamping device 30 respectively coupled in a position of two sides of the main body 12.

The first clamping device 20 includes a fixed member 21, a tightening member 22 and a clamping member 23. The fixed member 21 includes a base portion 211 and a fixed end 212 integrally formed from an extremity of the base portion 211 outwardly and upwardly. The base portion 211 is in a form of an arc plate and corresponds to a profile of the head portion 11 as to fittingly attach the base portion 211 onto the head portion 11. Two fixed holes 213 are formed on the base portion 211 and respectively correspond to the apertures 13. Two fasteners 214 are provided to insert through the fixed holes 213 to the apertures 13 to couple the base portion 211 to the head portion 11. In this embodiment, each fastener 214 is preferably a rivet. An engaged hole 215 is formed through the fixed end 212 transversely.

The tightening member 22 includes a body 221 and an adjusting element 222 separated from the body 221. The body 221 is in a form of a cylinder and has first and second ends, with an outer diameter of the first end of the body 221 being smaller than that of the second end of the body 221. The adjusting element 222 is in a form of a nut and has first and second ends. A polygonal periphery 2221 is formed on the first end of the adjusting element 222, and a first abutted portion 2222 is provided on the second end of the adjusting element 222. The first abutted portion 2222 is tapered and the outer diameter of the first abutted portion 2222 is reduced from the first end of the adjusting element 222 to the second end of the adjusting element 222. A threaded hole 2223 is longitudinally formed on the center of the first abutted portion 2222.

A coupled portion 223 and a first annular groove 224 are both provided on the outer periphery of the first end of the body 221, and an outer diameter of the coupled portion 223 is larger than that of the first annular groove 224. A through-hole 228 is longitudinally formed through the body 221 from the first end of the body 221 to the second end of the body 221, and two ends of the through-hole 228 are respectively opened outwardly. A slot 226 longitudinally pierces the body 221 from the second end of the body 221 to the first end of the body 221 along a center axis of the body 221. The slot 226 is opened to the second end of the slot 226 and adapted to communicate the first and second ends of the body 221 with each other. Two second annular grooves 227 are formed on the outer periphery of the second end of the body 221 and are provided on two sides of the slot 226.

A receptacle 225 is axially formed on the center of the second end of the body 221 and communicates with the through-hole 228. The receptacle 225 includes a polygonal hole 2251 and a second abutted portion 2252. An end of the polygonal hole 2251 is provided on an end surface of the second end of the body 221, and another end of the polygonal hole 2251 is formed by the second abutted portion 2252 towards the first end of the body 221. The receptacle 225 is adapted for receiving the adjusting element 222, and the polygonal periphery 2221 and the first abutted portion 2222 are respectively fittingly engaged with the polygonal hole 2251 and the second abutted portion 2252.

The clamping member 23 includes a coupled element 231, which has a top end and a bottom end, and a clamping ear unit 232 extending from the bottom end of the coupled element 231 downwardly and opposite to the top end of the coupled element 231. The top end of the coupled element 231 further includes a receptacle 233, a receiving groove 234 and a hole 235. The receptacle 233 is opened upwardly and provided between the receiving groove 234 and the hole 235, and a depth of the receptacle 233 is larger than that the receiving groove 234 with respect to the top end of the coupled element 231. The hole 235 pierces through a sidewall of the top end of the coupled element 231, and an extending direction of the hole 235 is perpendicular to that of the receptacle 233 and the receiving groove 234.

The clamping ear unit 232 consists of first and second ears 2321, 2322 which are spaced from each other, and a space 2325 is defined between the first and second ears 2321, 2322. A hole 2323 and a threaded hole 2324 are transversely formed in the first and second ears 2321, 2322 respectively.

The coupled element 231 of the clamping member 23 is attached to the tightening member 22. The coupled portion 223 is engaged with the receptacle 233, and the first annular groove 224 is engaged with the receiving groove 234. Further, a side of the coupled portion 223 is abutted against a side of the receiving groove 234 to prevent the coupled portion 223 detaching from the receiving groove 234. A first adjusted element 24 is inserted through the hole 235 and the through-hole 228 and is engaged with the threaded hole 2223 of the adjusting element 222 to adjust a degree of tightness between the adjusting element 222 and the receptacle 225. While tightening the first adjusted element 24 with the adjusting element 222, the first abutted portion 2222 of the adjusting element 222 moves toward the second abutted portion 2252 of the receptacle 225. Simultaneously, the slot 226 could be pushed outwardly by the adjusting element 222, and the second annular groove 227 is adapted to be a space cushion on the second end of the body 221.

The space 2325 of the clamping ear unit 232 is provided to receive the fixed end 212 of the fixed member 21, and the engaged hole 215 of the fixed member 21 corresponds to the hole 2323 and the threaded hole 2324 respectively. A second adjusted element 25 is inserted through the hole 2323 and the engaged hole 215 and engaged with the threaded hole 2324.

Each second clamping device 30 includes two clamping portions 31, a mudguard stay 32, a mounting element 33 and a belt 34. Each clamping portion 31 has a first end 311 and a second end 312, with the first end 311 adapted to fix the second clamping device 30 on the side of the main body 12 via a fastener 313. The mudguard stay 32 is U-shaped approximately and has two leg portions 321 and a center portion 322. An end of each leg portion 321 inserts into the second end 312 of each clamping portion 31 opposite to the first end 311 and bent to a small angle away from the whole leg portion 321. Another end of each leg portion 321 connects to the center portion 322 contiguously, and the angle of the connector exceeds 90 degrees. The mounting element 33 receives the center portion 322 therein and includes a hook 331 formed on a side thereof and a through hole 332 defined transversely therethrough. The belt 34 includes a first end 341 provided for inserting through the through hole 332 of the mounting element 33 and forming a greater width on the distal end thereof for fixing the first end 341 on the mounting element 33. The belt 34 further includes a second end 342 where a plurality of retaining holes 343 are defined. The retaining holes 343 can alternate to retain on the hook 331 to adjust the size of the annular enclosed area made from the mounting element 33 and the belt 34 via an easy tightening/loosening manner.

Figure 4:
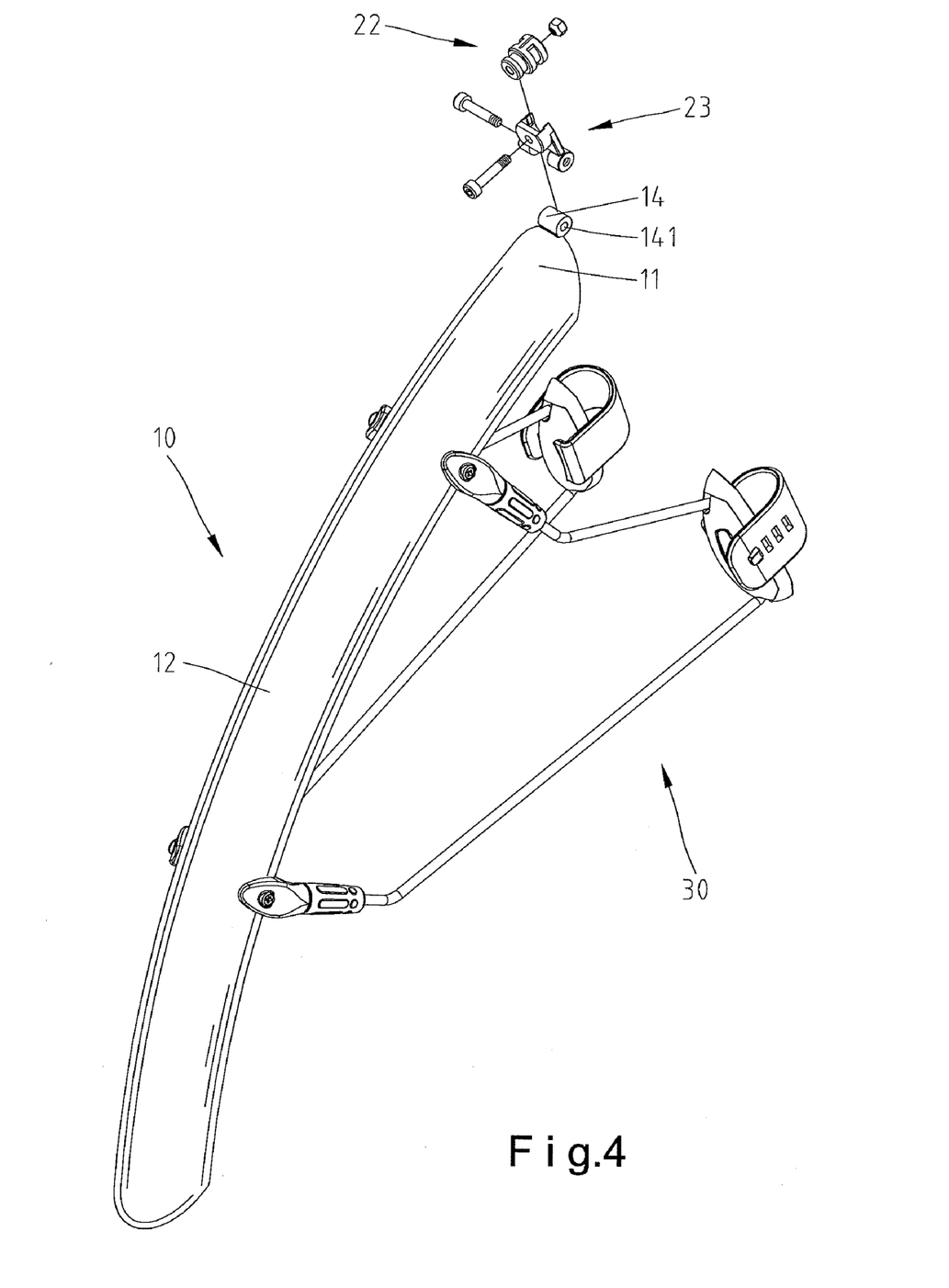
FIG. 4 shows a partial, exploded perspective view of a bicycle mudguard with a clamping assembly in accordance with the second embodiment of the present invention.

FIG. 4 shows a front mudguard 10 in accordance with a second embodiment in the present invention which is similar to the first embodiment except that the fixed member 21 is omitted, and a fixed end 14 is integrally formed from the extremity of the head portion 11 of the front mudguard 10 upwardly and outwardly. The fixed end 14 replaces the omitted fixed member 21 for coupling to the clamping member 23 and includes an engaged hole 141 defined therethrough transversely. Hence, the second adjusted element 25 is inserted through the hole 2323 and the engaged hole 141 and is engaged with the threaded hole 2324 to couple the clamping member 23 to the head portion 11 of the mudguard 10.

FIGS. 5 and 6 show the mudguard 10 according to the first embodiment attached to the front fork 40 via the first and second clamping devices 20 and 30. An orifice 41 is formed on the front fork 40 adapted to fix the front brake 42 to the front fork 40. Hence, an insertion tongue (not numbered) provided at an end of the front brake 42 is inserted into and engaged with the orifice 41 (shown in FIG. 5). Further referring to FIG. 3, the second end of the tightening member 22 is partially received in the orifice 41 of the front fork 40 opposite to the insertion of the front brake 42. A user can tighten the first adjusted element 24 till the adjusting element 222 is limited in the receptacle 225 and cannot rotate with respect to the first adjusted element 24. Then, the adjusting element 222 can only move longitudinally in the receptacle 225 with respect to the body 221, and the first abutted portion 2222 is tightened to the second abutted portion 2252. While the degree of tightness between the first and second abutted portions 2222, 2252 is increasing, the slot 226 is pushed more outwardly and moves closer to the interior wall of the orifice 41 of the front fork 40.

To assemble the front mudguard 10 onto the bicycle, the fixed end 212 of the fixed member 21 is clamped by the clamping member 23 of the first clamping device 20 first, and, then, the belts 34 are respectively tied onto uprights (not numbered) of the front fork 40. At the same time, the tightening member 22 is partially and tightly received in the orifice 41 in advance. The adjusting element 25 is adapted to adjust tightness between the clamping ear unit 232 and the fixed end 212 of the fixed member 21.

To disassemble the front mudguard 10 from the bicycle, the hook 331 is detached from the related one of retaining holes 343, and the belt 34 is loosened first. Then, the clamping member 23 is detached from the fixed member 21 by loosening the second adjusted element 25 and detaching the second adjusted element 25 from the threaded hole 2324, the engaged hole 215 and the hole 2323.

Figure 7:
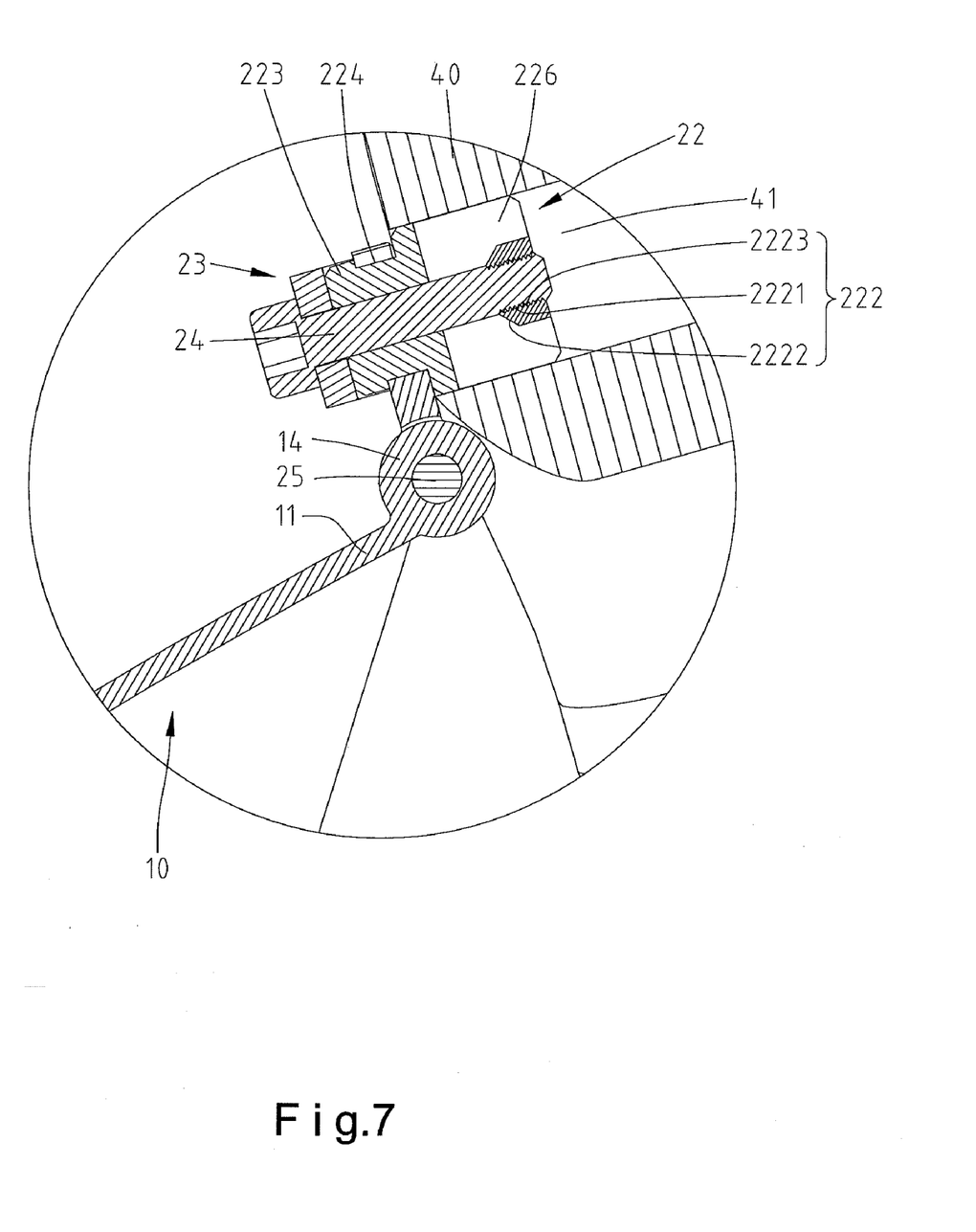
FIG. 7 is an enlarged, partial cross-section view of FIG. 5, showing the bicycle mudguard in accordance with the second embodiment of the present invention.

Furthermore, referring to FIG. 7, the clamping member 23 is installed to the fixed end 14 which is integrally formed from the head portion 11. The processes of assembly/disassembly of the front mudguard 10 of the second embodiment with/ from the bicycle are basically the same as that of the front mudguard 10 of the first embodiment. It will not be described in detailed below.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come with the meaning and range of equivalency of the claims are intended to be embraced therein.

What is claimed is:

1. A clamping assembly for detachably attaching a bicycle mudguard to a front fork of a bicycle, with the bicycle mudguard including a main body and a head portion extending from an end of the main body; the clamping assembly comprising:
    a fixed end provided on the head portion;
    a first clamping device including a clamping member, with the clamping member including a coupled element having top and bottom ends, with the first clamping device further including a tightening member having a body engaged with the top end of the coupled element and an adjusting element separated from and received in the body of the tightening member, with the tightening member partially and tightly received in an orifice of the front fork, with the fixed end detachably coupling the first clamping device to the bicycle mudguard;
    a first adjusted element inserted through the top end of the coupled element and the body of the tightening member and engaged with the adjusting element; and
    two second clamping devices respectively fixing two sides of the main body of the mudguard to the front fork; wherein each second clamping device includes an end thereof adapted to fix on the two sides of the main body respectively, a mounting element formed on another end opposite to the mudguard, and a belt fixed on the mounting element and adapted to tie on the front fork; wherein the belt has a first end fixed on the mounting element and a second end inserted through the mounting element and connected to the mounting element in an easy tightening/loosening manner.

2. The clamping assembly as claimed in claim 1, with each second clamping device further including a through hole defined in the mounting element transversely, with a width of the first end being larger than a width of the second end and the width of the second end being equal to a width of the through hole, with the first end inserted through the through hole to limit the belt on the mounting element.

3. The clamping assembly as claimed in claim 1, with each second clamping device further including a hook formed on the mounting element, with the second end of the belt defining a plurality of retaining holes thereon, with the hook retained into one of the plurality of retaining holes so that the belt and the mounting element define an annular enclosed area.

4. The clamping assembly as claimed in claim 1, with each second clamping device further including two clamping portions and a mudguard stay having two ends thereof inserted into the two clamping portions, with each clamping portion adapted for fixing each second clamping device onto one of the two sides of the mudguard, with the mudguard stay connecting each clamping portion to the mounting element.

5. The clamping assembly as claimed in claim 1, with the body of the tightening member having a first end engaged with the coupled element and a second end received in the orifice of the front fork; wherein the first end of the body of the tightening member defines a coupled portion and a first annular groove both provided on the outer periphery thereof, with the first end of the body of the tightening member having a through-hole formed therethough longitudinally, with the first adjusted element adapted to be inserted through the through-hole; wherein the top end of the coupled element defines a receptacle and a receiving groove, with the first annular groove engaged with the receiving groove.

6. The clamping assembly as claimed in claim 5, further comprising a receptacle axially formed on a center of the second end of the body of the tightening member and communicating with the through-hole, with the receptacle including a polygonal hole and a second abutted portion, with the receptacle receiving the adjusting element, and with the adjusting element including a polygonal periphery and the first abutted portion which are respectively fittingly engaged with the polygonal hole and the second abutted portion.

7. A clamping assembly for detachably attaching a bicycle mudguard to a front fork of a bicycle, with the bicycle mudguard including a main body and a head portion extending from an end of the main body; the clamping assembly comprising:
    a fixed end provided on the head portion;
    a first clamping device including a clamping member, with the clamping member including a coupled element having top and bottom ends, with the first clamping device further including a tightening member having a body engaged with the top end of the coupled element and an adjusting element separated from and received in the body of the tightening member, with the tightening member partially and tightly received in an orifice of the front fork, with the fixed end detachably coupling the first clamping device to the bicycle mudguard;
    a first adjusted element inserted through the top end of the coupled element and the body of the tightening member and engaged with the adjusting element, with the body of the tightening member having a first end engaged with the coupled element and a second end received in the orifice of the front fork; wherein the first end of the body of the tightening member defines a coupled portion and a first annular groove both provided on the outer periphery thereof, with the first end of the body of the tightening member having a through-hole formed therethough longitudinally, with the first adjusted element adapted to be inserted through the through-hole; wherein the top end of the coupled element defines a receptacle and a receiving groove, with the first annular groove engaged with the receiving groove;
    a receptacle axially formed on a center of the second end of the body of the tightening member and communicating with the through-hole, with the receptacle including a polygonal hole and a second abutted portion, with the receptacle receiving the adjusting element, and with the adjusting element including a polygonal periphery and the first abutted portion which are respectively fittingly engaged with the polygonal hole and the second abutted portion; and
    a slot longitudinally piercing the second end of the body of the tightening member along a center axis of the body of the tightening member and communicating the first and second ends of the body of the tightening member with each other.

8. The clamping assembly as claimed in claim 7, further comprising two second annular grooves formed on an outer periphery of the second end of the body of the tightening member and provided on two sides of the slot.

9. The clamping assembly as claimed in claim 7, further comprising a clamping ear unit extending from the bottom end of the coupled element and a second adjusted element inserted through the clamping ear unit and the fixed end to detachably couple the first clamping device to the bicycle mudguard.

10. The clamping assembly as claimed in claim 9, further comprising an engaged hole formed through the fixed end transversely, with the second adjusted element inserted through the engaged hole.

11. A clamping assembly for detachably attaching a bicycle mudguard to a front fork of a bicycle, with the bicycle mudguard including a main body and a head portion extending from an end of the main body; the clamping assembly comprising:
   a fixed end including an engaged hole and provided on the head portion;
   a first clamping device including a clamping member, with the clamping member including a coupled element having top and bottom ends, with the first clamping device further including a tightening member having a body engaged with the top end of the coupled element and an adjusting element separated from and received in the body of the tightening member, with the tightening member partially and tightly received in an orifice of the front fork, with the fixed end detachably coupling the first clamping device to the bicycle mudguard;
   a first adjusted element inserted through the top end of the coupled element and the body of the tightening member and engaged with the adjusting element;
   a clamping ear unit extending from the bottom end of the coupled element; and
   a second adjusted element inserted through the clamping ear unit and the fixed end to detachably couple the first clamping device to the bicycle mudguard, wherein the clamping ear unit includes first and second ears, wherein a space is defined between the first and second ears; wherein a hole and a threaded hole are transversely formed in the first and second ears respectively, with the space of the clamping ear unit receiving the fixed end, with the engaged hole corresponding to the hole and the threaded hole respectively, and with the second adjusted element extending through the hole and the engaged hole and engaged with the threaded hole.

12. The clamping assembly as claimed in claim 11, further comprising a fixed member including a base portion, with the fixed end integrally formed from an extremity of the base portion outwardly and upwardly.

13. The clamping assembly as claimed in claim 11, with the fixed end integrally formed from an extremity of the head portion of the front mudguard upwardly and outwardly.

14. A clamping assembly for detachably attaching a bicycle mudguard to a front fork of a bicycle, with the bicycle mudguard including a main body and a head portion extending from an end of the main body; the clamping assembly comprising:
   a fixed end provided on the head portion;
   a first clamping device including a clamping member, with the clamping member including a coupled element having top and bottom ends, with the first clamping device further including a tightening member having a body engaged with the top end of the coupled element and an adjusting element separated from and received in the body of the tightening member, with the tightening member partially and tightly received in an orifice of the front fork, with the fixed end detachably coupling the first clamping device to the bicycle mudguard;
   a first adjusted element inserted through the top end of the coupled element and the body of the tightening member and engaged with the adjusting element;
   a clamping ear unit extending from the bottom end of the coupled element and a second adjusted element inserted through the clamping ear unit and the fixed end to detachably couple the first clamping device to the bicycle mudguard;
   a fixed member including a base portion, with the fixed end integrally formed from an extremity of the base portion outwardly and upwardly;
   two apertures formed on the head portion;
   two fixed holes formed on the base portion; and
   fasteners inserted through the two fixed holes to the two apertures to couple the base portion to the head portion.

15. The clamping assembly as claimed in claim 14, wherein the orifice is adapted to fix a front brake to the front fork.

16. The clamping assembly as claimed in claim 15, further comprising an insertion provided at an end of the front brake for being inserted into and engaged with the orifice opposite to the tightening member.

* * * * *